(12) United States Patent
Shukla et al.

(10) Patent No.: US 11,907,907 B2
(45) Date of Patent: Feb. 20, 2024

(54) SYSTEM AND METHOD FOR CENTRALIZED INNOVATION FRAMEWORK

(71) Applicant: JPMorgan Chase Bank, N.A., New York, NY (US)

(72) Inventors: Manish Shukla, London (GB); Brian Clawson, Glen Mills, PA (US); Vidhya Rao, Bengaluru (IN); Peter Antony Hangal Jeorge, London (GB); Abraham McCauley, London (GB); Mark Osman, Mumbai (IN); Pranjal K Tiwari, Thane West (IN); Arvind Bhanushali, Houston, TX (US); Tancy Chiu Yang Tan, Singapore (SG); Cheryl Tanaja, Singapore (SG); Raj Solanki, Hong Kong (HK); Kanako Minami Redhead, Singapore (SG)

(73) Assignee: JPMORGAN CHASE BANK, N.A., New York, NY (US)

( * ) Notice: Subject to any disclaimer, the term of this patent is extended or adjusted under 35 U.S.C. 154(b) by 212 days.

(21) Appl. No.: 17/234,088

(22) Filed: Apr. 19, 2021

(65) Prior Publication Data

US 2022/0284398 A1 Sep. 8, 2022

(30) Foreign Application Priority Data

Mar. 4, 2021 (IN) .............................. 202111009168

(51) Int. Cl.
*G06Q 10/101* (2023.01)
*H04L 67/00* (2022.01)
(Continued)

(52) U.S. Cl.
CPC ......... *G06Q 10/101* (2013.01); *G06Q 10/103* (2013.01); *H04L 67/34* (2013.01); *G06F 11/3672* (2013.01)

(58) Field of Classification Search
None
See application file for complete search history.

(56) References Cited

U.S. PATENT DOCUMENTS

2005/0267807 A1* 12/2005 Bentley .............. G06Q 30/0269
  705/14.66
2007/0276675 A1* 11/2007 Gabrick ................ G06Q 10/10
  709/204

(Continued)

OTHER PUBLICATIONS

R. Osorno and N. Medrano, "Open Innovation Platforms: A Conceptual Design Framework," in IEEE Transactions on Engineering Management, vol. 69, No. 2, pp. 438-450, Apr. 2022, doi: 10.1109/TEM.2020.2973227. (Date of publication Feb. 27, 2020.).*

*Primary Examiner* — Peter Ludwig
*Assistant Examiner* — Donald J Edmonds
(74) *Attorney, Agent, or Firm* — GREENBLUM & BERNSTEIN, P.L.C.

(57) ABSTRACT

A system and method for implementing a centralized innovation framework module are disclosed. A processor is operatively connected to one or more memories via a communication network. The processor creates a centralized web-based collaborative platform hub for collection of innovation ideas data from end users within an operation space and causes the centralized web-based collaborative platform hub to receive innovation ideas data from an end user related to development of an application. The processor also analyzes the received innovation ideas data establishes, based on analyzing, a connection between the centralized web-based collaborative platform hub and a development platform; migrates the received innovation ideas data onto the (Continued)

development platform; and creates a workflow on the development platform for tracking and managing development processes of the application.

17 Claims, 10 Drawing Sheets

(51) Int. Cl.
*G06Q 10/10* (2023.01)
*G06F 11/36* (2006.01)

(56) References Cited

U.S. PATENT DOCUMENTS

| | | | | |
|---|---|---|---|---|
| 2009/0216578 A1* | 8/2009 | Bechtel | ............ | G06Q 30/0203 705/7.32 |
| 2009/0326999 A1* | 12/2009 | Duke | ................ | G06Q 30/0203 705/7.32 |
| 2010/0174662 A1* | 7/2010 | Fabella, Jr. | ............. | G06Q 10/06 709/204 |
| 2010/0205025 A1* | 8/2010 | Johansen | ............. | G06Q 10/101 709/204 |
| 2011/0093539 A1* | 4/2011 | Laurin | ................... | G06Q 10/06 709/205 |
| 2013/0132162 A1* | 5/2013 | Banerjee | ........... | G06Q 10/0637 705/7.36 |
| 2014/0214691 A1* | 7/2014 | Morris, III | ........... | G06Q 10/101 705/300 |
| 2016/0155131 A1* | 6/2016 | Miloslavsky | ...... | G06Q 30/0269 705/14.66 |
| 2018/0124135 A1* | 5/2018 | Dunne | ..................... | G06N 5/02 |
| 2018/0174103 A1* | 6/2018 | Auger | ................... | G06Q 10/10 709/204 |
| 2018/0357032 A1* | 12/2018 | Popovich | .......... | G06Q 30/0203 705/7.32 |
| 2019/0340516 A1* | 11/2019 | Kumar | ..................... | G06N 5/02 |
| 2020/0193263 A1* | 6/2020 | Pham | ................... | G06Q 10/103 |
| 2020/0387373 A1* | 12/2020 | Crabtree | ................... | G06F 8/71 |

* cited by examiner

SYSTEM AND METHOD FOR CENTRALIZED INNOVATION FRAMEWORK

CROSS-REFERENCE TO RELATED APPLICATIONS

This application claims the benefit of priority from Indian Patent Application No. 202111009168, filed Mar. 4, 2021, which is herein incorporated by reference in its entirety.

TECHNICAL FIELD

This disclosure generally relates to data collection, and, more particularly, to methods and apparatuses for implementing a centralized innovation framework module for collection of innovation ideas data from end users within an operation space and systemic feeding of those data onto a product development platform.

BACKGROUND

Today's corporations, agencies, institutions, and other organizations are facing a continuing problem of handling and processing a vast amount of data related to innovation ideas in a quick and expedited manner and managing quality of data received from various sources for allowing an agile development approach. The vast amount of data often received periodically (i.e., daily, weekly, or monthly basis) from various innovation teams within an organization may be now stored electronically in various databases and may need to be analyzed by a variety of persons within the organization relative to meeting product (i.e., application) development goals. The need to determine efficiently what data and tools may be available for analysis and product development across organizational management boundaries to process data in an expedited manner may prove to be extremely time consuming and manual in nature. For example, today, technology platforms across an organization may lack consistent reporting and tracking of success measures related to innovation.

SUMMARY

The present disclosure, through one or more of its various aspects, embodiments, and/or specific features or sub-components, provides, among other features, various systems, servers, devices, methods, media, programs, and platforms for implementing a centralized innovation framework module for collection of innovation ideas data from end users within an operation space and systemic feeding of those data onto a product development platform for allowing an agile development approach with prioritization and governance aspects standardized across projects and functional areas, but the disclosure is not limited thereto.

According to an aspect of the present disclosure, a method for implementing a centralized innovation framework module by utilizing one or more processors and one or more memories is disclosed. The method may include: creating a centralized web-based collaborative platform hub for collection of innovation ideas data from end users within an operation space; causing the centralized web-based collaborative platform hub to receive innovation ideas data from an end user related to development of an application; analyzing the received innovation ideas data; establishing, based on analyzing, a connection between the centralized web-based collaborative platform hub and a development platform; migrating the received innovation ideas data onto the development platform; and creating a workflow on the development platform for tracking and managing development processes of the application.

According to another aspect of the present disclosure, the centralized web-based collaborative platform hub may be a centralized share point hub, but the disclosure is not limited thereto.

According to yet another aspect of the present disclosure, the development platform may be configured to provide agile project management tool that supports agile methodology in tracking and managing the development processes of the application, but the disclosure is not limited thereto.

According to a further aspect of the present disclosure, the method may further include: establishing an automatic connectivity point between the centralized web-based collaborative platform hub and a tracking and governance system.

According to yet another aspect of the present disclosure, the method may further include: automatically transmitting data related to build status data via the automatic connectivity point; and receiving the build status data from the centralized web-based collaborative platform hub.

According to another aspect of the present disclosure, the method may further include: receiving predefined compliance data related to final approval of the application onto the centralized web-based collaborative platform hub; automatically generating test cases based on the received predefined compliance data; executing the test cases; and approving the application to go live when the centralized web-based collaborative platform hub receives data related to passing of the test cases.

According to a further aspect of the present disclosure, the method may further include: receiving reconciliation data onto the centralized web-based collaborative platform hub to reconcile issues in developing the application based on received data related to failing of one or more test cases.

According to yet another aspect of the present disclosure, the method may further include: systematically feeding the innovation ideas data onto the centralized web-based collaborative platform hub; analyzing the innovation ideas data; prioritizing application development projects based on the analyzed innovation ideas data; and implementing governance aspects data standardized across the application development projects and functional areas.

According to a further aspect of the present disclosure, a system for implementing a centralized innovation framework module is disclosed. The system may include a processor and one or more memories operatively connected to the processor via a communication network, wherein the processor may be configured to: create a centralized web-based collaborative platform hub for collection of innovation ideas data from end users within an operation space; cause the centralized web-based collaborative platform hub to receive innovation ideas data from an end user related to development of an application; analyze the received innovation ideas data; establish, based on analyzing, a connection between the centralized web-based collaborative platform hub and a development platform; migrate the received innovation ideas data onto the development platform; and create a workflow on the development platform for tracking and managing development processes of the application.

According to an additional aspect of the present disclosure, the processor may be further configured to: establish an automatic connectivity point between the centralized web-based collaborative platform hub and a tracking and governance system.

According to another aspect of the present disclosure, the processor may be further configured to: automatically transmit data related to build status data via the automatic connectivity point; and receive the build status data from the centralized web-based collaborative platform hub.

According to yet another aspect of the present disclosure, the processor may be further configured to: receive predefined compliance data related to final approval of the application onto the centralized web-based collaborative platform hub; automatically generate test cases based on the received predefined compliance data; execute the test cases, and approve the application to go live when the centralized web-based collaborative platform hub receives data related to passing of the test cases.

According to another aspect of the present disclosure, the processor may be further configured to: receive reconciliation data onto the centralized web-based collaborative platform hub to reconcile issues in developing the application based on received data related to failing of one or more test cases.

According to a further aspect of the present disclosure, the processor may be further configured to: systematically feed the innovation ideas data onto the centralized web-based collaborative platform hub; analyze the innovation ideas data; prioritize application development projects based on the analyzed innovation ideas data; and implement governance aspects data standardized across the application development projects and functional areas.

According to yet another aspect of the present disclosure, the output device may be utilized by the data consumer, and the processor may be further configured to: cause the output device to receive the data contract along with the attached digital data contract compliance certificate; and automatically process the data contract for enforcement of the data contract without requiring any need to contact the data provider.

According to yet another aspect of the present disclosure, a non-transitory computer readable medium configured to store instructions for implementing a centralized innovation framework module is disclosed. The instructions, when executed, may cause a processor to perform the following: creating a centralized web-based collaborative platform hub for collection of innovation ideas data from end users within an operation space; causing the centralized web-based collaborative platform hub to receive innovation ideas data from an end user related to development of an application; analyzing the received innovation ideas data; establishing, based on analyzing, a connection between the centralized web-based collaborative platform hub and a development platform; migrating the received innovation ideas data onto the development platform; and creating a workflow on the development platform for tracking and managing development processes of the application.

According to a further aspect of the present disclosure, the instructions, when executed, may cause the processor to further perform the following: establishing an automatic connectivity point between the centralized web-based collaborative platform hub and a tracking and governance system.

According to yet another aspect of the present disclosure, the instructions, when executed, may cause the processor to further perform the following: automatically transmitting data related to build status data via the automatic connectivity point; and receiving the build status data from the centralized web-based collaborative platform hub.

According to another aspect of the present disclosure, the instructions, when executed, may cause the processor to further perform the following: receiving predefined compliance data related to final approval of the application onto the centralized web-based collaborative platform hub; automatically generating test cases based on the received predefined compliance data; executing the test cases; and approving the application to go live when the centralized web-based collaborative platform hub receives data related to passing of the test cases.

According to a further aspect of the present disclosure, the instructions, when executed, may cause the processor to further perform the following: receiving reconciliation data onto the centralized web-based collaborative platform hub to reconcile issues in developing the application based on received data related to failing of one or more test cases.

According to yet another aspect of the present disclosure, the instructions, when executed, may cause the processor to further perform the following: systematically feeding the innovation ideas data onto the centralized web-based collaborative platform hub; analyzing the innovation ideas data; prioritizing application development projects based on the analyzed innovation ideas data; and implementing governance aspects data standardized across the application development projects and functional areas.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
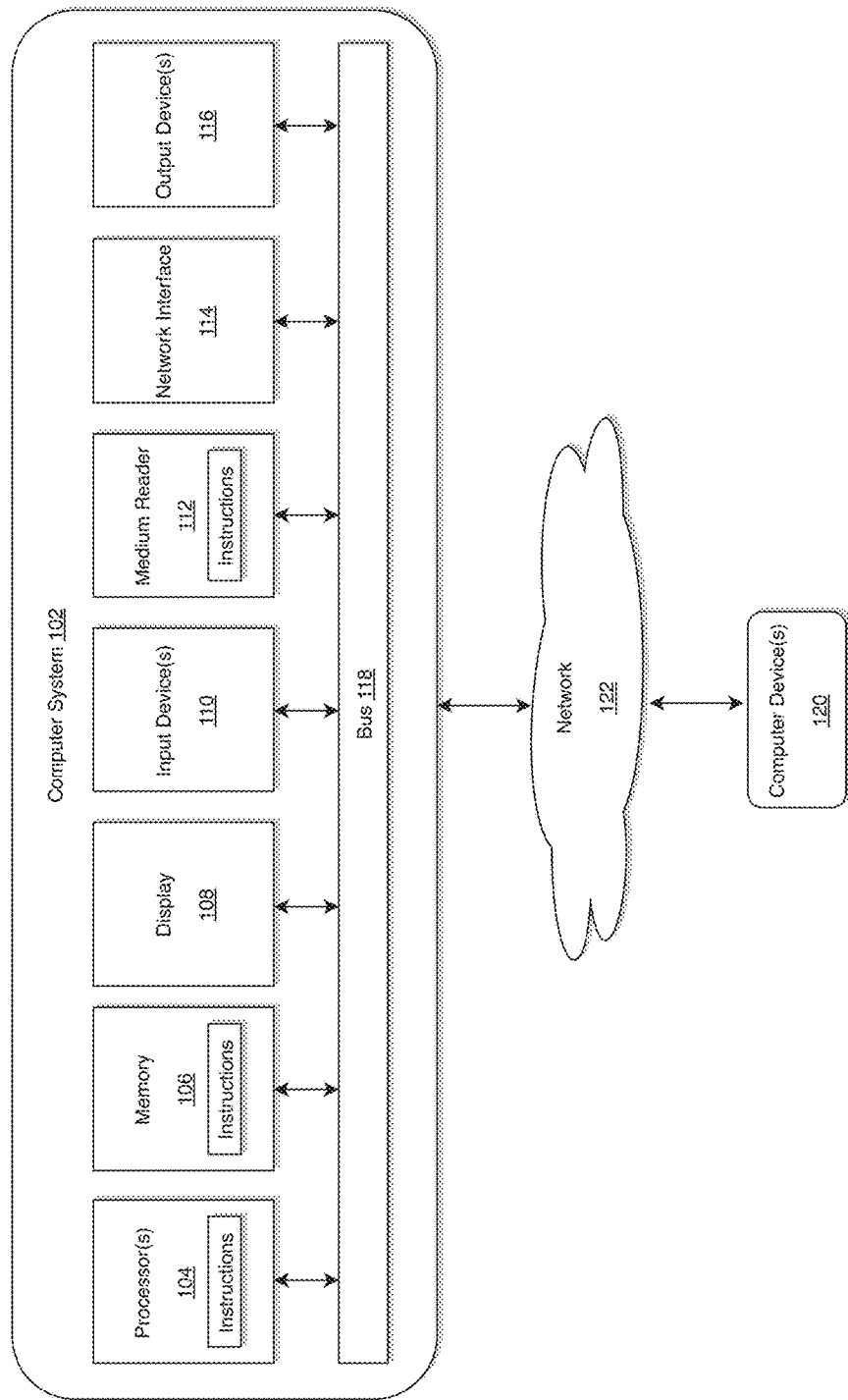
FIG. 1 illustrates a computer system for implementing a centralized innovation framework module in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in accordance with the embodiments described herein for implementing a centralized innovation framework module for collection of innovation ideas data from end users within an operation space and systemic feeding of those data onto a product development platform, but the disclosure is not limited thereto. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
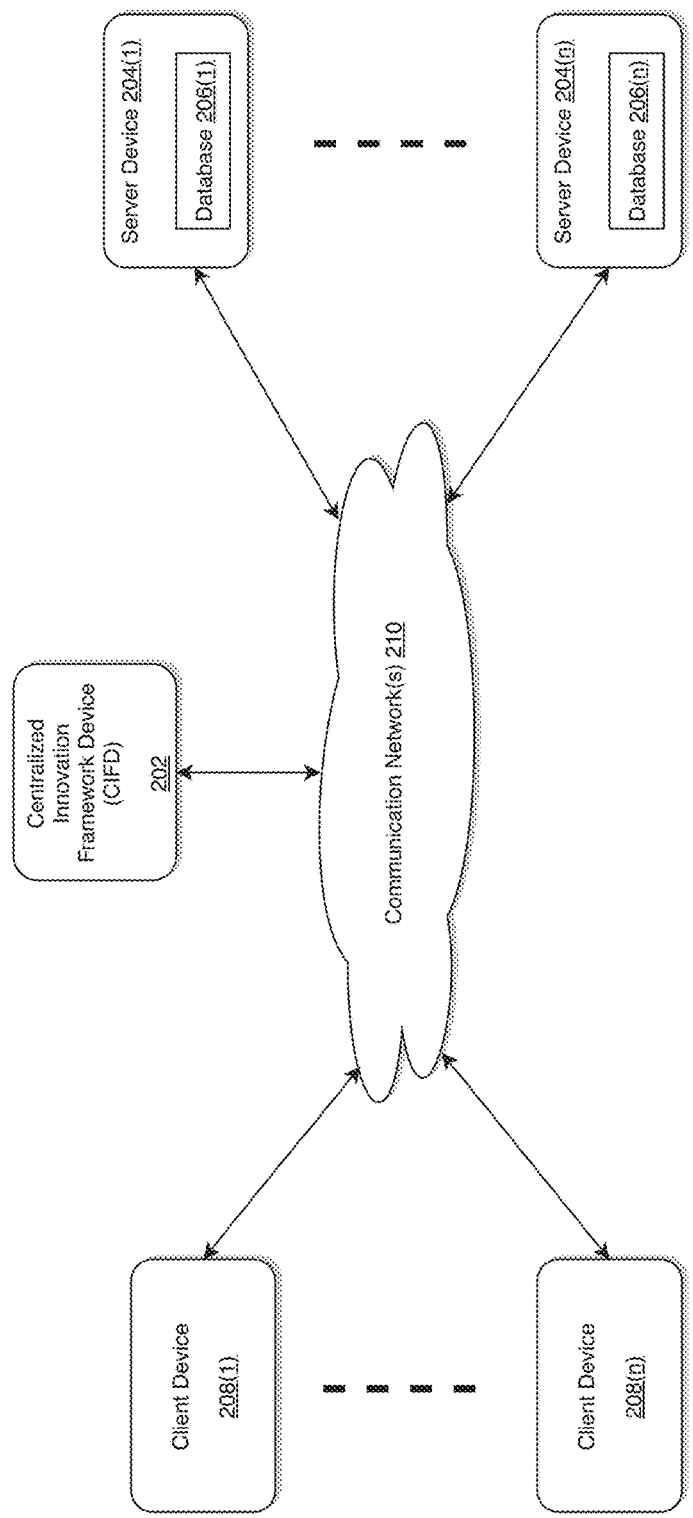
FIG. 2 illustrates an exemplary diagram of a network environment with a centralized innovation framework device in accordance with an exemplary embodiment.

Referring to FIG. 2, a schematic of an exemplary network environment 200 for implementing a centralized innovation framework device (CIFD) of the instant disclosure is illustrated.

According to exemplary embodiments, the above-described problems associated with conventional approach of software development may be overcome by implementing a CIFD 202 as illustrated in FIG. 2 that may provide a platform for implementing a centralized innovation framework module, but the disclosure is not limited thereto.

For example, the various aspects, embodiments, and/or specific features or sub-components of the instant disclosure, provide, among other features, various systems, servers, devices, methods, media, programs, and platforms for implementing a centralized innovation framework module for collection of innovation ideas data from end users within an operation space and systemic feeding of those data onto a product development platform for allowing an agile development approach with prioritization and governance aspects standardized across projects and functional areas, but the disclosure is not limited thereto.

The CIFD 202 may be the same or similar to the computer system 102 as described with respect to FIG. 1.

The CIFD 202 may store one or more applications that can include executable instructions that, when executed by the CIFD 202, cause the CIFD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the CIFD 202 itself, may be located in virtual server(s) running in a cloud-based computing environment rather than being tied to one or more specific physical network computing devices. Also, the application(s) may be running in one or more virtual machines (VMs) executing on the CIFD 202. Additionally, in one or more embodiments of this technology, virtual machine(s) running on the CIFD 202 may be managed or supervised by a hypervisor.

In the network environment 200 of FIG. 2, the CIFD 202 is coupled to a plurality of server devices 204(1)-204(n) that hosts a plurality of databases 206(1)-206(n) including adaptive data storages, and also to a plurality of client devices 208(1)-208(n) via communication network(s) 210. A communication interface of the CIFD 202, such as the network interface 114 of the computer system 102 of FIG. 1, operatively couples and communicates between the CIFD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the CIFD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The CIFD 202 may be a standalone device or integrated with one or more other devices or apparatuses, such as one or more of the server devices 204(1)-204(n), for example. In one particular example, the CIFD 202 may be hosted by one of the server devices 204(1)-204(n), and other arrangements are also possible. Moreover, one or more of the devices of the CIFD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204 (n) may include, among other features, one or more processors, a memory, and a communication interface, which are coupled together by a bus or other communication link, although other numbers and/or types of network devices may be used. The server devices 204(1)-204(n) in this example may process requests received from the CIFD 202 via the communication network(s) 210 according to the HTTP-based, HTTPS-based, and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206 (n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204 (1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the CIFD 202 that may efficiently provide a platform for implementing the CIFD 202 which may be configured to automatically handle and process a vast amount of data in a quick and expedited manner and manage quality of data received for software development purposes, thereby significantly increasing data processing speed and significantly reducing lapse time that may be necessary to manage data quality of data that is flowing between a plurality of computing devices for software development purposes, but the disclosure is not limited thereto.

The client devices 208(1)-208(n) may run interface applications, such as standard web browsers or standalone client applications, which may provide an interface to communicate with the CIFD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the CIFD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the CIFD 202, the server devices 204(1)-204(n), or the client devices 208(1)-208(n), for example, may be configured to operate as virtual instances on the same physical machine. For example, one or more of the CIFD 202, the server devices 204(1)-204(n), or the client devices 208(1)-208(n) may operate on the same physical device rather than as separate devices communicating through communication network(s) 210. Additionally, there may be more or fewer CIFDs 202, server devices 204(1)-204(n), or client devices 208(1)-208(n) than illustrated in FIG. 2. According to exemplary embodiments, the CIFD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
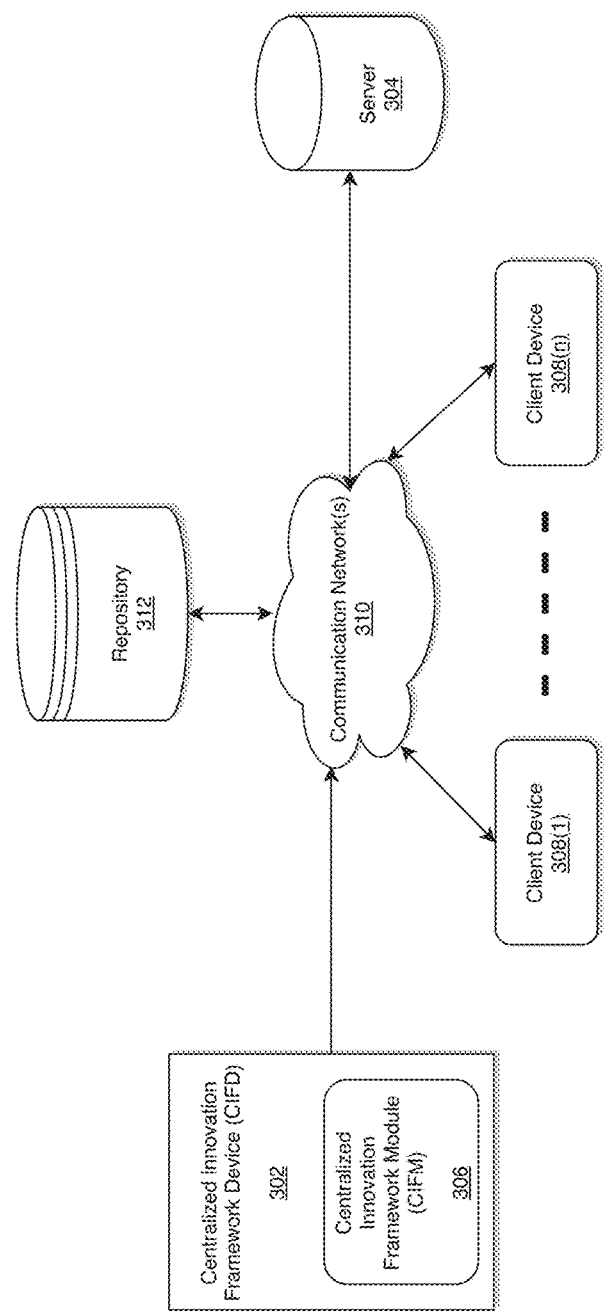
FIG. 3 illustrates a system diagram for implementing a centralized innovation framework device having a centralized innovation framework module in accordance with an exemplary embodiment.

FIG. 3 illustrates a system diagram 300 for implementing a CIFD having a centralized innovation framework module (CIFM) in accordance with an exemplary embodiment.

As illustrated in FIG. 3, the CIFD 302 including the CIFM 306 may be connected to a server 304, and a repository 312 including one or more memories via a communication network 310. The CIFD 302 may also be connected to a plurality of client devices 308(1)-308(n) via the communication network 310, but the disclosure is not limited thereto.

According to exemplary embodiment, the CIFD 302 is described and shown in FIG. 3 as including the CIFM 306, although it may include other rules, policies, modules, databases, or applications, for example. According to exemplary embodiments, the repository 312 may be embedded within the CIFD 302. Although only one repository 312 is illustrated in FIG. 3, according to exemplary embodiments, a plurality of repositories 312 may be provided. The repository 312 may include one or more memories configured to store device-based policies and user-based policies, but the disclosure is not limited thereto. For example, the repository 312 may include one or more memories configured to store information including: rules, programs, requirements, configurable threshold values defined by a product team to validate against service level objective (SLO), machine learning models, log data, hash values, etc., but the disclosure is not limited thereto. According to exemplary embodiments, the CIFM 306 may be configured to be storage platform agnostic—configured to be deployed across multiple storage layers.

According to exemplary embodiments, the CIFM 306 may be configured to receive continuous feed of data from the repository 312 via the communication network 310.

As will be described below, the CIFM 306 may be configured to: creating a centralized web-based collaborative platform hub for collection of innovation ideas data from end users within an operation space; causing the centralized web-based collaborative platform hub to receive innovation ideas data from an end user related to development of an application; analyzing the received innovation ideas data; establishing, based on analyzing, a connection between the centralized web-based collaborative platform hub and a development platform; migrating the received innovation ideas data onto the development platform; and creating a workflow on the development platform for tracking and managing development processes of the application, but the disclosure is not limited thereto.

For example, according to exemplary embodiments, the CIFM 306 may be configured to create a centralized SharePoint hub for the collection of innovation ideas from end users within the operations space, then systematically feed those ideas into JIRA to allow for an agile development approach with prioritization and governance aspects standardized across projects and functional areas.

For example, the CIFM 306 may be implemented for connecting SharePoint to JIRA with a daily Alteryx job that migrates the SharePoint data and creates JIRA workflows for tracking ideas and projects, but the disclosure is not limited thereto. Alteryx may also used to reconcile and report on project status and other outcomes utilizing Tableau as a front-end BI tool, but the disclosure is not limited thereto.

For example, to encourage adoption and standardize the innovation process, regional employees act as internal consultants on an innovation team by utilizing the CIFM 306. These employees may be functional experts on automation tools such as BOT, Alteryx, Tableau, Xceptor, iRecs, MS Office, and others, and can assist in developing automation solutions by utilizing the CIFM 306. In addition, they can reach out to teams and individuals using automation software and guide them through the centralized innovation process by implementing the CIFM 306.

The CIFM 306, according to exemplary embodiments, may allow combining a user-friendly idea generation platform on SharePoint with automated connectivity to a tracking and governance system so that all involved parties, from compliance to IT, can review each project. By utilizing the CIFM 306, the operations teams are engaged from their management and from the innovation team repeatedly, and are encouraged to self-generate ideas and seek solutions using the automation tool kit, thereby driving and promoting innovation that can remove manual work from operational roles, and to do so in a way that can be standardized.

The plurality of client devices 308(1)-308(n) are illustrated as being in communication with the CIFD 302. In this regard, the plurality of client devices 308(1)-308(n) may be "clients" of the CIFD 302 and are described herein as such. Nevertheless, it is to be known and understood that the plurality of client devices 308(1)-308(n) need not necessarily be "clients" of the CIFD 302, or any entity described in association therewith herein. Any additional or alternative relationship may exist between either or more of the plurality of client devices 308(1)-308(n) and the CIFD 302, or no relationship may exist.

One of the plurality of client devices 308(1)-308(n) may be, for example, a computer, a laptop, or a mobile device, but the disclosure is not limited thereto. Of course, the plurality of client devices 308(1)-308(n) may be any additional device described herein, e.g., a laptop, a computer, or a mobile device, but the disclosure is not limited thereto. According to exemplary embodiments, the server 304 may be the same or equivalent to the server device 204 as illustrated in FIG. 2.

The process may be executed via the communication network 310, which may comprise plural networks as described above. For example, in an exemplary embodiment, either one or more of the plurality of client devices 308(1)-308(n) may communicate with the CIFD 302 via broadband or cellular communication. Of course, these embodiments are merely exemplary and are not limiting or exhaustive.

Figure 4:
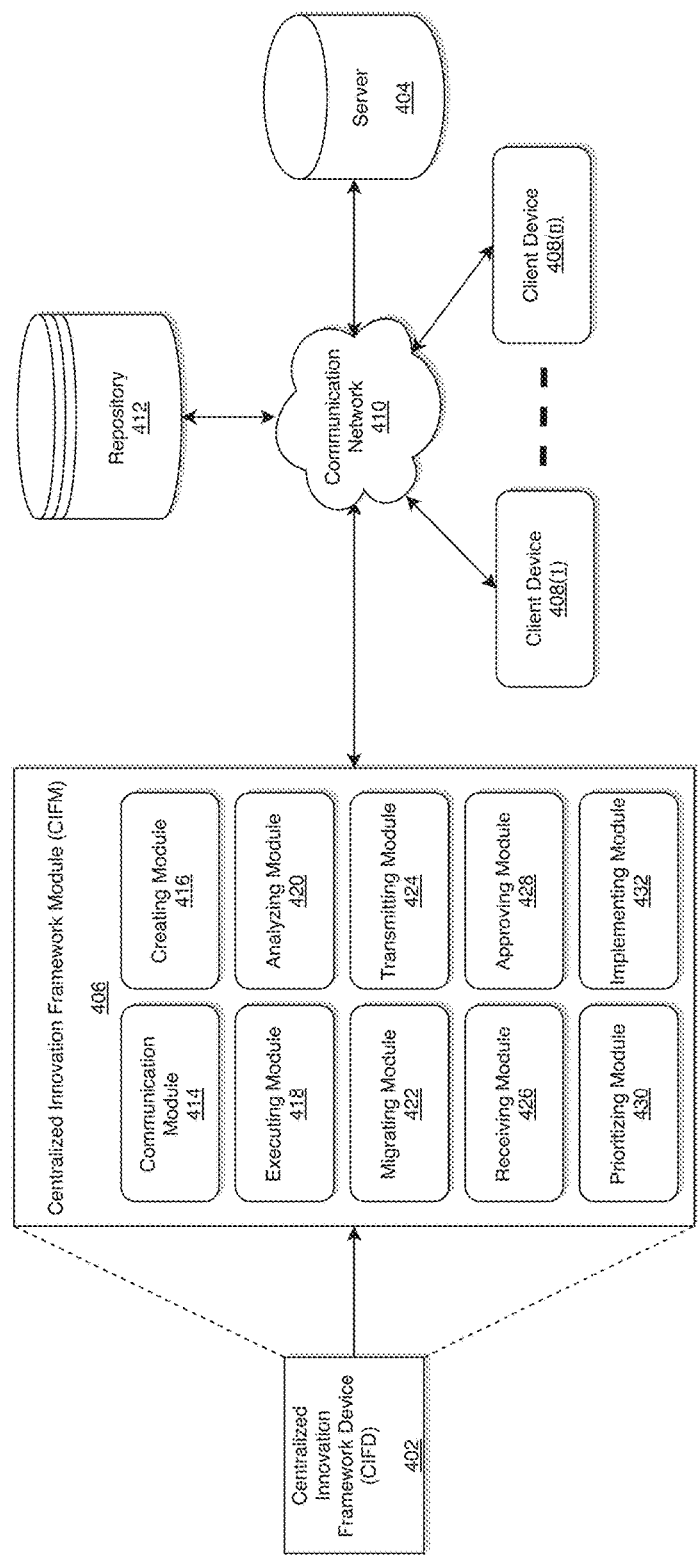
FIG. 4 illustrates a system diagram for implementing a centralized innovation framework module of FIG. 3 in accordance with an exemplary embodiment.

FIG. 4 illustrates a system diagram having a CIFM of FIG. 3 in accordance with an exemplary embodiment.

As illustrated in FIG. 4, the system 400 may include a CIFD 402 within which a CIFM 406 may be embedded, a repository 412, a server 404, client devices 408(1)-408(n), and a communication network 410. According to exemplary embodiments, the CIFD 402, CIFM 406, repository 412, the server 404, the client devices 408(1)-408(n), and the communication network 410 as illustrated in FIG. 4 may be the same or similar to the CIFD 302, the CIFM 306, the repository 312, the server 304, the client devices 308(1)-308(n), and the communication network 310, respectively, as illustrated in FIG. 3.

According to exemplary embodiments, the repository 312, 412 may be a cloud-based repository that supports user authentication, repository security, and integration with existing databases and developments, but the disclosure is not limited thereto.

As illustrated in FIG. 4, the CIFM 406 may include a communication module 414, a creating module 416, an executing module 418, an analyzing module 420, a migrating module 422, a transmitting module 424, a receiving module 426, an approving module 428, a prioritizing module 430, and an implementing module 432. According to exemplary embodiments, the repository 412 may be external to the CIFD 402 may include various systems that are managed and operated by an organization. Alternatively, according to exemplary embodiments, the repository 412 may be embedded within the CIFD 402 and/or the CIFM 406.

The process may be executed via the communication module 414 and the communication network 410 which may comprise plural networks as described above. For example, in an exemplary embodiment, the various components of the CIFM 406 may communicate with the server 404, and the repository 412 via the communication module 414 and the communication network 410. Of course, these embodiments are merely exemplary and are not limiting or exhaustive.

According to exemplary embodiments, the communication network 410 and the communication module 414 may be configured to establish a link between the repository 412, the client devices 408(1)-408(n) and the CIFM 406.

According to exemplary embodiments, each of the communication module 414, creating module 416, executing module 418, analyzing module 420, migrating module 422, transmitting module 424, receiving module 426, approving module 428, prioritizing module 430, and the implementing module 432 may be implemented by microprocessors or similar, they may be programmed using software (e.g., microcode) to perform various functions discussed herein and may optionally be driven by firmware and/or software. Alternatively, each of the communication module 414, creating module 416, executing module 418, analyzing module 420, migrating module 422, transmitting module 424, receiving module 426, approving module 428, prioritizing module 430, and the implementing module 432 may be implemented by dedicated hardware, or as a combination of dedicated hardware to perform some functions and a processor (e.g., one or more programmed microprocessors and associated circuitry) to perform other functions. Also, according to exemplary embodiments, each of the communication module 414, creating module 416, executing module 418, analyzing module 420, migrating module 422, transmitting module 424, receiving module 426, approving module 428, prioritizing module 430, and the implementing module 432 may be physically separated into two or more interacting and discrete blocks, units, devices, and/or modules without departing from the scope of the inventive concepts.

FIG. 5A-5E, in combination, illustrate a process flow (i.e., a CIA (centralized intelligent automation)—JIRA flow) where the CIFM 406 may be configured to create a centralized SharePoint hub for the collection of innovation ideas from end users within the operations space, then systematically feed those ideas into JIRA to allow for an agile development approach with prioritization and governance aspects standardized across projects and functional areas.

For example, the CIFM 406 may be implemented for connecting SharePoint to JIRA with a daily Alteryx job that migrates the SharePoint data and creates JIRA workflows for tracking ideas and projects, but the disclosure is not limited thereto. Alteryx may also be used to reconcile and report on project status and other outcomes utilizing Tableau as a front-end BI tool, but the disclosure is not limited thereto.

For example, to encourage adoption and standardize the innovation process, regional employees act as internal consultants on an innovation team by utilizing the CIFM 406. These employees may be functional experts on automation tools such as BOT, Alteryx, Tableau, Xceptor, iRecs, MS Office, and others, and can assist in developing automation solutions by utilizing the CIFM 406. In addition, they can reach out to teams and individuals using automation software and guide them through the centralized innovation process by implementing the CIFM 406.

The CIFM 406, according to exemplary embodiments, may allow combining a user-friendly idea generation platform on SharePoint with automated connectivity to a tracking and governance system so that all involved parties, from compliance to IT, can review each project. By utilizing the CIFM 406, the operations teams (i.e., operations subject matter experts—hereinafter referred to as OPS SME) are engaged from their management and from the innovation team repeatedly, and are encouraged to self-generate ideas and seek solutions using the automation tool kit, thereby driving and promoting innovation that can remove manual work from operational roles, and to do so in a way that can be standardized.

Figure 5A:
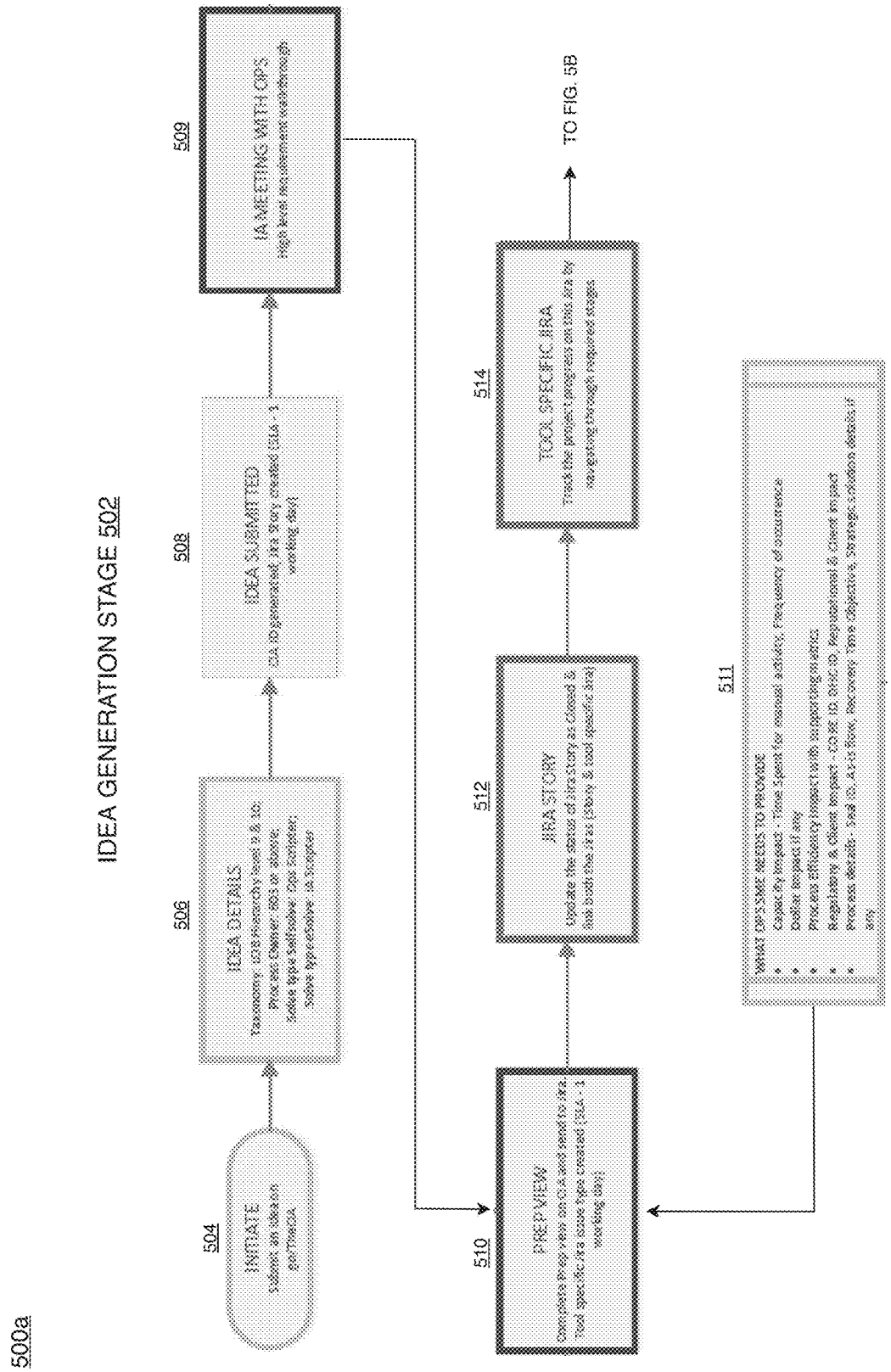
FIG. 5A illustrates a flow diagram of an idea generation stage of a centralized innovation framework module of FIG. 4 in accordance with an exemplary embodiment.

For example, FIG. 5A illustrates a flow diagram 500a of an idea generation stage 502 of a CIA-JIRA flow implemented by the CIFM 406 of FIG. 4 in accordance with an exemplary embodiment. In this process flow diagram 500a, at 504, the process may begin by submitting an idea on the CIFM 406. At 506, idea details (i.e., taxonomy, process owner; solve type (e.g., self-solve or e-solve) may be obtained. At 508, idea may be submitted in which CIA ID may be generated, JIRA story may be created (SLA—1 working day). At 509, intelligent automation (IA) meeting with operations may be set where high level requirement walkthrough data is generated. At 510, preparation view may be generated in which a complete preparation view is generated on CIA and sent to JIRA. Also, tool specific JIRA issue type is created at 510 (SLA—1 working day). According to exemplary embodiments, the OPS SME may need to provide information data regarding capacity impact (i.e., time spent for manual activity, frequency of occurrence); dollar impact if any; process efficiency impact with supporting metrics; regulatory and client impact; and process details (i.e., seal ID, as-is flow, recovery time objective, strategic solution details if any). At 512, JIRA story data may be generated. At 514, tool specific JIRA may be generated which tracks the project progress on this JIRA by navigating through required stages. Then the process 500*a* moves to decision block 518 of FIG. 5B.

Figure 5B:
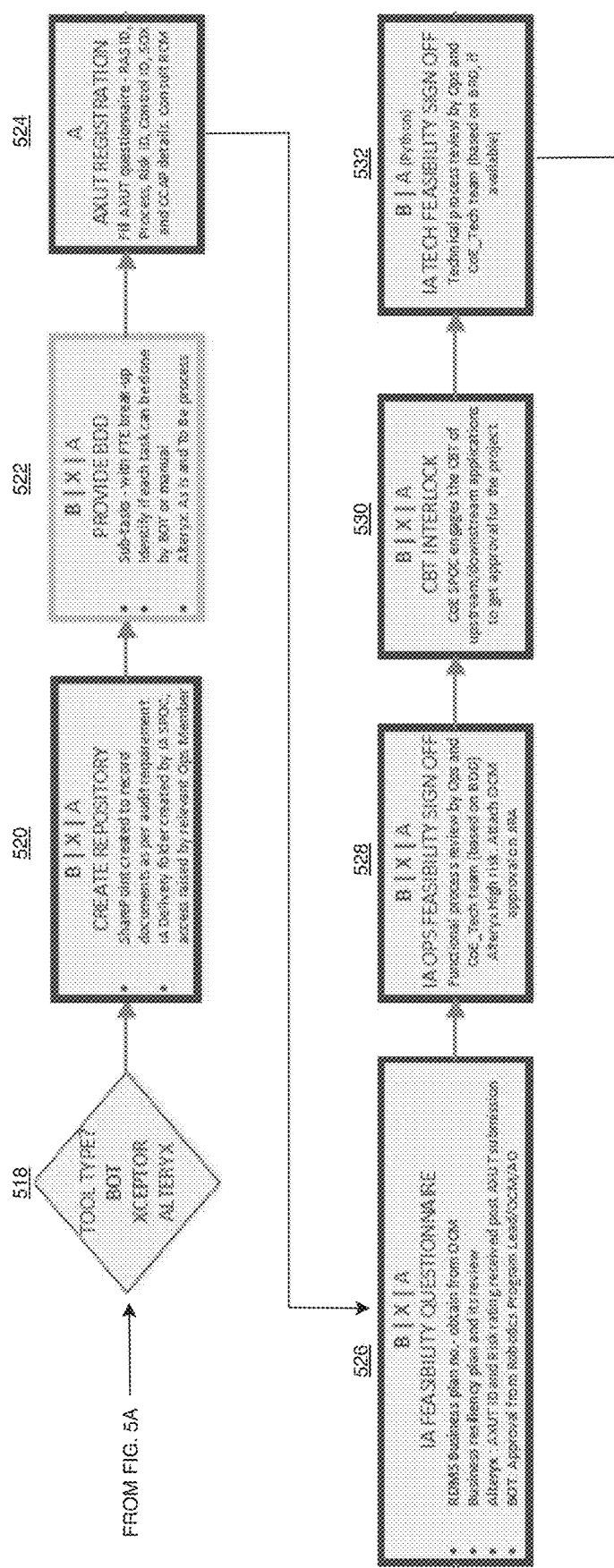
FIG. 5B illustrates a flow diagram of an opportunity identified stage of a centralized innovation framework module of FIG. 4 in accordance with an exemplary embodiment.

FIG. 5B illustrates a flow diagram 500*b* of an opportunity identified stage 516 of the CIA-JIRA flow implemented by the CIFM 406 of FIG. 4 in accordance with an exemplary embodiment. In this process flow diagram 500*b*, at 518, a decision is made to select a tool type (i.e., BOT, XCEPTOR, ALTERYX, but the disclosure is not limited thereto). At 520, a repository is created where SharePoint is created to record documents as per audit requirement and IA delivery folder is created by IA SPOC. At 522, sub-tasks (with FTE break-up may be provided. At this step, it is also identified whether each task can be done by BOT or manual. At 524, AXUT registration is completed. At 526, IA feasibility questionnaire data may be generated. At 528. IA OPS feasibility sign off is completed. At 530, CBT interlock is completed. For example, CoE SPOC may engage the CBT of upstream/downstream applications to get approval for the project. At 532, IA tech feasibility sign off is completed. Then, the process 500*b* moves to a readiness and development state 534 of FIG. 5C.

Figure 5C:
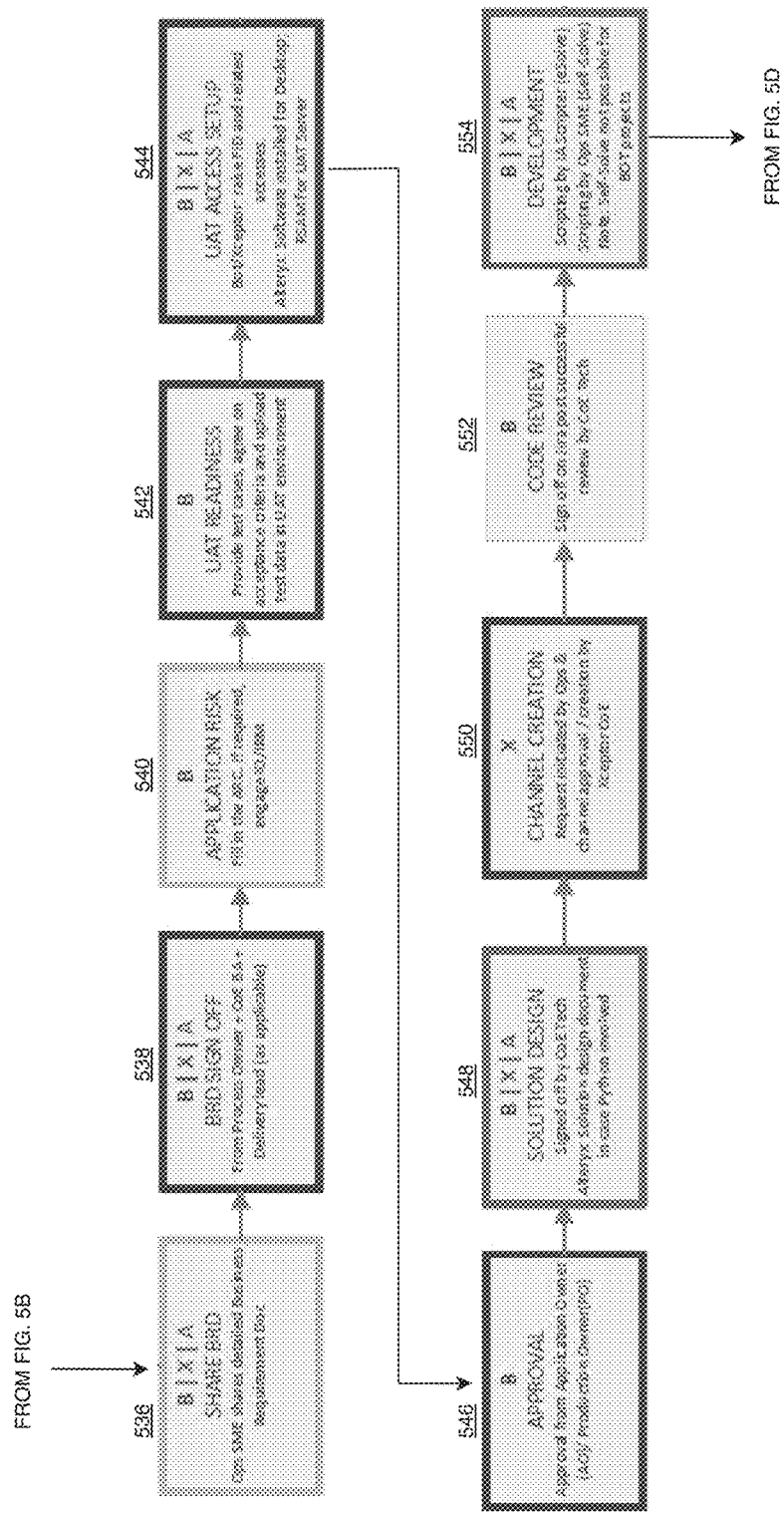
FIG. 5C illustrates a flow diagram of readiness and development stage of a centralized innovation framework module of FIG. 4 in accordance with an exemplary embodiment.

FIG. 5C illustrates a flow diagram 500*c* of the readiness and development stage 534 of the CIA-JIRA flow implemented by the CIFM 406 of FIG. 4 in accordance with an exemplary embodiment. In this process flow diagram 500*c*, at 536, OPS SME may share detailed business requirements documents. At 538, BRD sign off is completed (i.e., from process owner, CoE BA and delivery lead (as applicable)). At 540, application risk data is generated. At 542, UAT (user acceptance testing) readiness is decided. For example, test cases may be generated; acceptance criteria may be agreed upon and test data may be uploaded in UAT environment. At 544, UAT access is set up. At 546, if BOT tool is selected at 518, approval from application owner (AO) or production owner (PO) is completed. At 548, solution design may signed off by CoE tech. At 550, if XCEPTOR tool is selected at 518, channel creation is completed where request is initiated by OPS and channel approval or creation is completed by XCEPTOR CoE. At 552, code review is completed if BOT tool is selected at 518. At 554, application development is completed. Then, the process 500*c* moves to testing stage 556 of FIG. 5D.

Figure 5D:
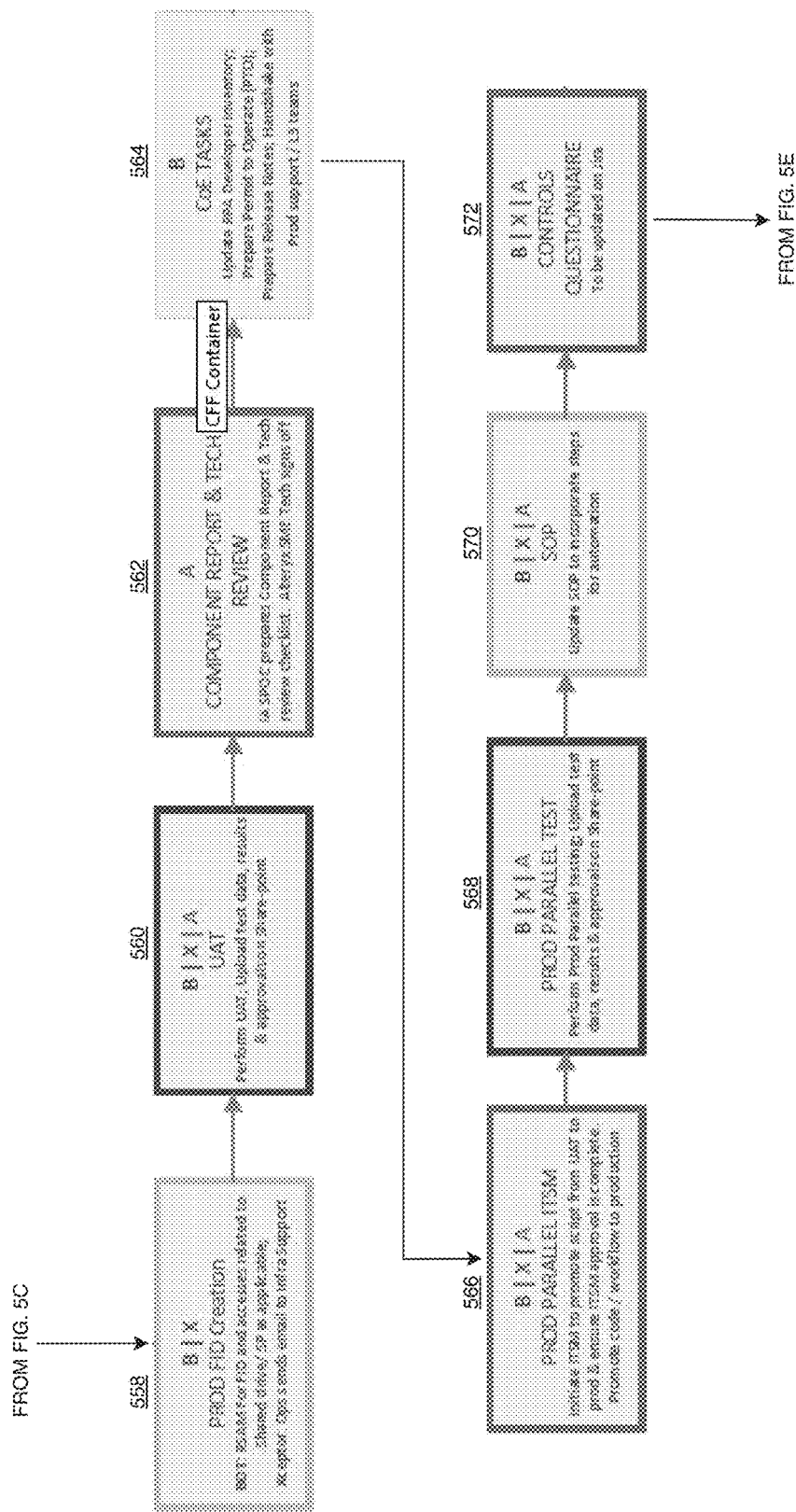
FIG. 5D illustrates a flow diagram of a testing stage of a centralized innovation framework module of FIG. 4 in accordance with an exemplary embodiment.

FIG. 5D illustrates a flow diagram 500*d* of a testing stage 556 of the CIA-JIRA flow implemented by the CIFM 406 of FIG. 4 in accordance with an exemplary embodiment. In this process flow diagram 500*d*, at 558, production FID is created. At 560, UAT is performed, test data is uploaded and approval is generated on SharePoint. At 562, component report and tech review data is generated. At 564, RPA developer inventory is updated, permit to operate (PO) is generated, and release notes may be generated. At 566, ITSM (IT service management) may be initiated to promote script from UAT to production and ITSM approval is ensured. At 568, production parallel testing may be performed, test data, results, and approvals may be uploaded on SharePoint. At 570. SOP (standard operating procedures) may be updated to incorporate steps for automation. At 572, controls questionnaire may be updated on JIRA. Then the process 500*d* moves to go live stage 574 of FIG. 5E.

Figure 5E:
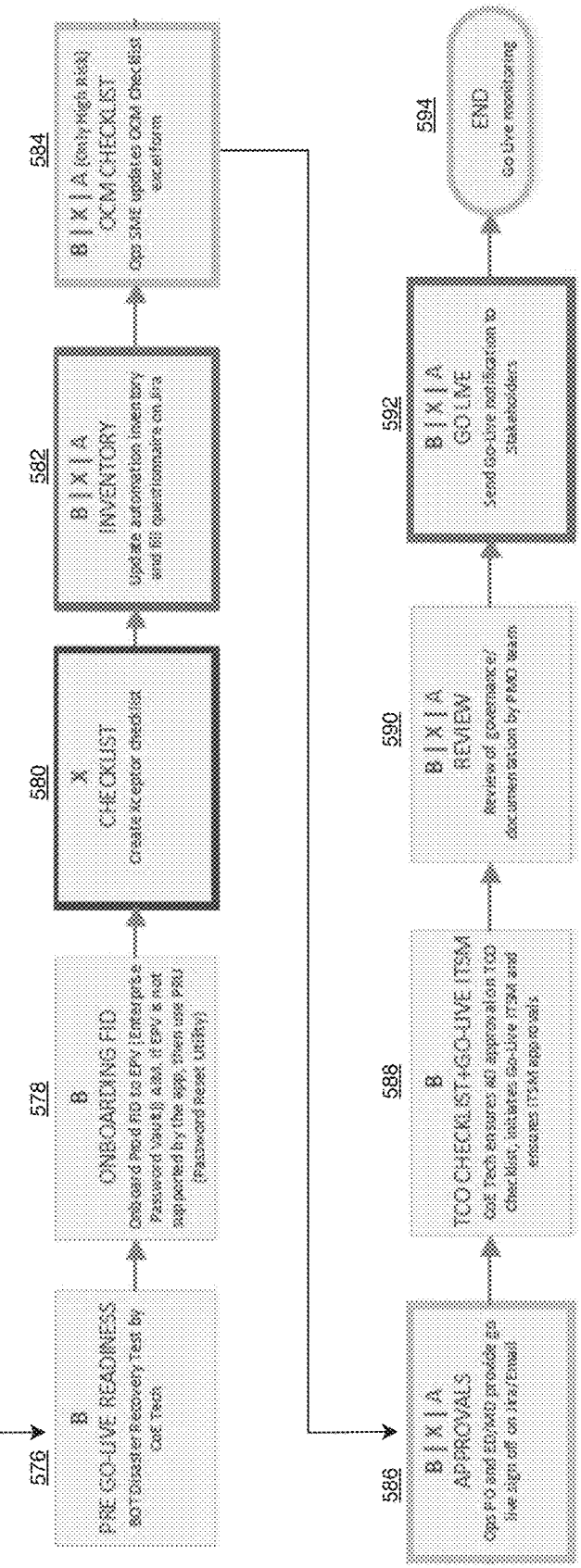
FIG. 5E illustrates a flow diagram of a go live stage of a centralized innovation framework module of FIG. 4 in accordance with an exemplary embodiment.

FIG. 5E illustrates a flow diagram 500*e* of a go live stage 574 of the CIA-JIRA flow implemented by the CIFM 406 of FIG. 4 in accordance with an exemplary embodiment. In this process flow diagram 500*e*, at 576, pre go-live readiness is completed. At 578, onboarding FID is completed. At 580 XCEPTOR checklist is created if XCEPTOR tool is selected at 518. At 582, automation inventory is updated and questionnaire is filled out on JIRA. At 584, OCM checklist is completed. At 586, OPS PTO and ED/MD provide go live sign off (approvals) on JIRA/Email. At 588. TCO checklist and go-live ITSM is completed if BOT tool is selected at 518. At 590, review (i.e., review of governance or documentation by PMO team) is completed. At 592, go live notification may be sent to stakeholder. At 594, go live session may be monitored.

According to exemplary embodiments, in FIGS. 5B-5E, "B" designates required projects if BOT tool is selected at 518 of FIG. 5B; "X" designates required projects if XCEPTOR tool is selected at 518 of FIG. 5B; and "A" designates required projects if ALTERYX tool is selected at 518 of FIG. 5B.

According to exemplary embodiments, in FIGS. 5A-5E, the primary responsibilities of OPS SME may include the following steps in the CIA-JIRA flow diagram: 504, 506, 511, 532, 536, 540, 558, 570, 584, 586, and 590.

According to exemplary embodiments, in FIGS. 5A-5E, the primary responsibilities of IA SPOC may include the following steps in the CIA-JIRA flow diagram: 512, 514, 548, 554, 562, 566, 572, 582, and 592.

According to exemplary embodiments, in FIGS. 5A-5E, the primary responsibilities of both IA SPOC and OPS SME may include the following steps in the CIA-JIRA flow diagram: 509, 510, 520, 524, 526, 528, 530, 532, 538, 542, 544, 546, 550, 560, 568, and 580.

According to exemplary embodiments, the CIFM 406 may provide links to one or more of the following for the CIA-JIRA flow: IA-execution cycle and toll gates; IA-JIRA user guide; GEO dashboard—internal; and GEO dashboard—external, but the disclosure is not limited thereto.

Referring to FIGS. 4 and 5A-5E, according to exemplary embodiments, the creating module 416 may be configured to create a centralized web-based collaborative platform hub for collection of innovation ideas data from end users (e.g., users utilizing the client devices 408(1)-408(*n*)) within an operation space. The executing module 418 may cause the centralized web-based collaborative platform hub to receive (e.g., by utilizing the receiving module 426) innovation ideas data from an end user (e.g., a user utilizing one of the client devices 408(1)-408(*n*)) related to development of an application (e.g., a software application).

According to exemplary embodiments, the analyzing module 420 may be configured to analyze the received innovation ideas data and the communication module 414 may establish, based on analyzing, a connection between the centralized web-based collaborative platform hub and a development platform.

According to exemplary embodiments, the migrating module 422 may be configured to migrate the received innovation ideas data onto the development platform and the creating module 416 may be configured to create a workflow on the development platform for tracking and managing development processes of the application.

According to exemplary embodiments, the centralized web-based collaborative platform hub may be a centralized share point (i.e., Microsoft SharePoint) hub, but the disclosure is not limited thereto.

According to exemplary embodiments, the development platform may be configured to provide agile project management tool that supports agile methodology in tracking and managing the development processes of the application, but the disclosure is not limited thereto.

According to exemplary embodiments, the communication module 414 may be configured to establish an automatic connectivity point between the centralized web-based collaborative platform hub and a tracking and governance system. One of the client device 408(1)-408(n) may be utilized as the tracking and governance system.

According to exemplary embodiments, the transmitting module 424 may be configured to automatically transmit data related to build status data via the automatic connectivity point and the receiving module 426 may receive the build status data from the centralized web-based collaborative platform hub.

According to exemplary embodiments, the receiving module 426 may also receive predefined compliance data related to final approval of the application onto the centralized web-based collaborative platform hub. The creating module 416 may also automatically generate test cases based on the received predefined compliance data. The executing module 418 may execute the test cases and the approving module 428 may be configured to approve the application to go live when the centralized web-based collaborative platform hub receives data related to passing of the test cases.

According to exemplary embodiments, the receiving module 426 may be configured to also receive reconciliation data onto the centralized web-based collaborative platform hub to reconcile issues in developing the application based on received data related to failing of one or more test cases.

According to exemplary embodiments, the CIFM 406 may be configured to systematically feed the innovation ideas data onto the centralized web-based collaborative platform hub. The analyzing module 420 may analyze the innovation ideas data. The prioritizing module 430 may prioritize application development projects based on the analyzed innovation ideas data and the implementing module 432 may implement governance aspects data standardized across the application development projects and functional areas.

Figure 6:
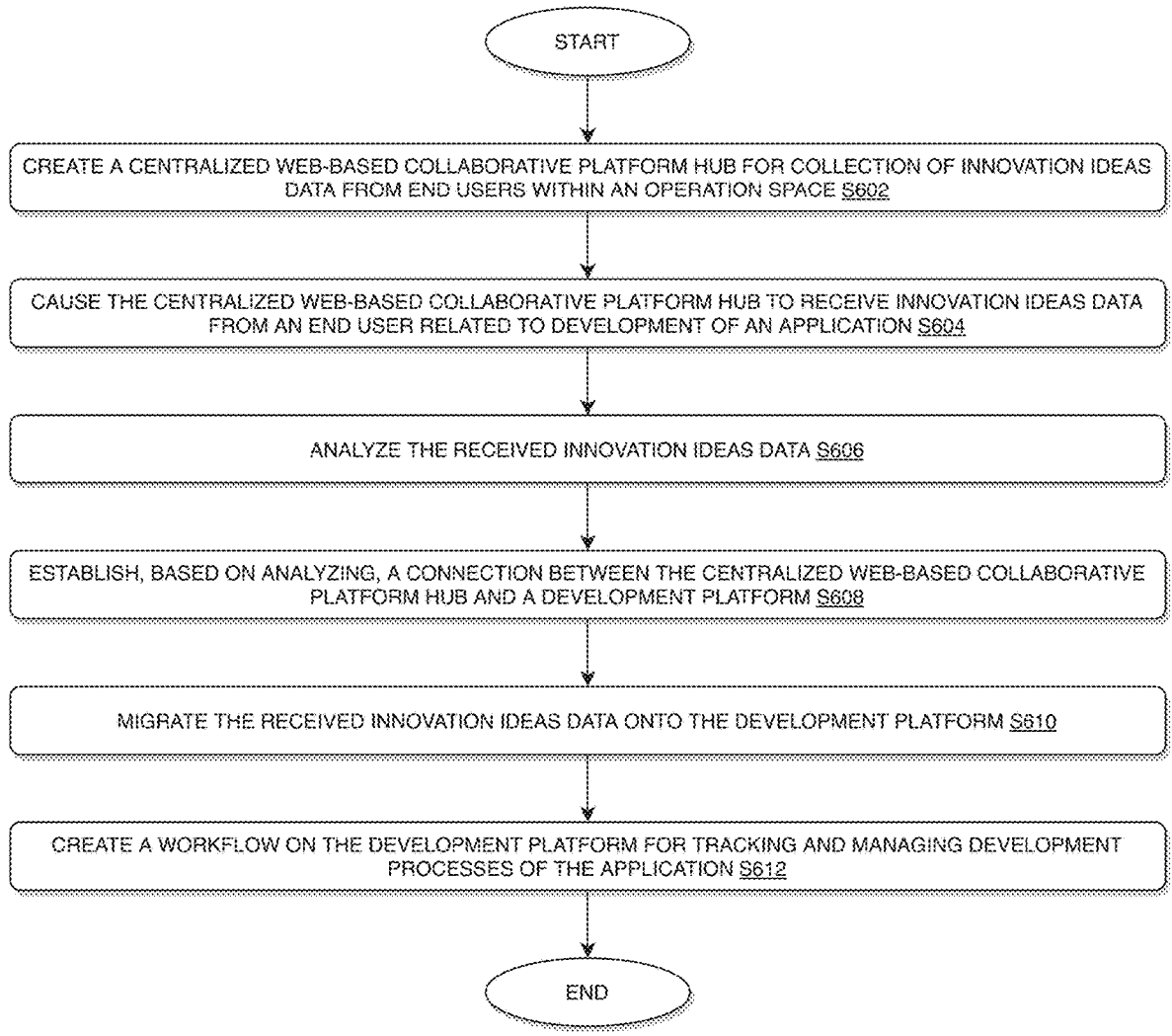
FIG. 6 illustrates a flow chart of a process for implementing a centralized innovation framework module in accordance with an exemplary embodiment.

FIG. 6 illustrates a flow chart of a process 600 for implementing a centralized innovation framework module in accordance with an exemplary embodiment.

At step S602, the process 600 may include creating a centralized web-based collaborative platform hub for collection of innovation ideas data from end users within an operation space. At step S604, the process 600 may include causing the centralized web-based collaborative platform hub to receive innovation ideas data from an end user related to development of an application. At step S606, the process 600 may include analyzing the received innovation ideas data. At step S608, the process 600 may include establishing, based on analyzing, a connection between the centralized web-based collaborative platform hub and a development platform. At step S610, the process 600 may include o migrating the received innovation ideas data onto the development platform. At step S612, the process 600 may include creating a workflow on the development platform for tracking and managing development processes of the application.

According to exemplary embodiments, the process 600 may further include other functionalities as disclosed herein with respect to FIGS. 1-5E.

For example, according to exemplary embodiments, the process 600 may further include establishing an automatic connectivity point between the centralized web-based collaborative platform hub and a tracking and governance system.

According to exemplary embodiments, the process 600 may further include: automatically transmitting data related to build status data via the automatic connectivity point; and receiving the build status data from the centralized web-based collaborative platform hub.

According to exemplary embodiments, the process 600 may further include: receiving predefined compliance data related to final approval of the application onto the centralized web-based collaborative platform hub; automatically generating test cases based on the received predefined compliance data; executing the test cases; and approving the application to go live when the centralized web-based collaborative platform hub receives data related to passing of the test cases.

According to exemplary embodiments, the process 600 may further include: receiving reconciliation data onto the centralized web-based collaborative platform hub to reconcile issues in developing the application based on received data related to failing of one or more test cases.

According to exemplary embodiments, the process 600 may further include: systematically feeding the innovation ideas data onto the centralized web-based collaborative platform hub; analyzing the innovation ideas data; prioritizing application development projects based on the analyzed innovation ideas data; and implementing governance aspects data standardized across the application development projects and functional areas.

Referring to FIGS. 4 and 5A-5E, according to exemplary embodiments, the CIFD 402 may include a memory (e.g., a memory 106 as illustrated in FIG. 1) which may be a non-transitory computer readable medium that may be configured to store instructions for implementing a CIFM 406 for collection of innovation ideas data from end users within an operation space and systemic feeding of those data onto a product development platform for allowing an agile development approach with prioritization and governance aspects standardized across projects and functional areas, but the disclosure is not limited thereto. The computing device CIFD 402 may also include a medium reader (e.g., a medium reader 112 as illustrated in FIG. 1) which may be configured to read any one or more sets of instructions, e.g., software, from any of the memories described herein. The instructions, when executed by a processor (e.g., a processor 104 as illustrated in FIG. 1) embedded within the CIFM 406 or within the CIFD 402, may be used to perform one or more of the methods and processes as described herein. In a particular embodiment, the instructions may reside completely, or at least partially, within the memory 106, the medium reader 112, and/or the processor 104 (see FIG. 1) during execution by the CIFD 402.

For example, the instructions, when executed, may cause the processor 104 to perform the following: creating a centralized web-based collaborative platform hub for collection of innovation ideas data from end users within an operation space; causing the centralized web-based collaborative platform hub to receive innovation ideas data from an end user related to development of an application; analyzing the received innovation ideas data; establishing, based on analyzing, a connection between the centralized web-based collaborative platform hub and a development platform; migrating the received innovation ideas data onto the development platform; and creating a workflow on the development platform for tracking and managing development processes of the application.

According to exemplary embodiments, the instructions, when executed, may cause the processor 104 to further perform the following: establishing an automatic connectivity point between the centralized web-based collaborative platform hub and a tracking and governance system.

According to exemplary embodiments, the instructions, when executed, may cause the processor 104 to further perform the following: automatically transmitting data related to build status data via the automatic connectivity point; and receiving the build status data from the centralized web-based collaborative platform hub.

According to exemplary embodiments, the instructions, when executed, may cause the processor 104 to further perform the following: receiving predefined compliance data related to final approval of the application onto the centralized web-based collaborative platform hub; automatically generating test cases based on the received predefined compliance data; executing the test cases; and approving the application to go live when the centralized web-based collaborative platform hub receives data related to passing of the test cases.

According to exemplary embodiments, the instructions, when executed, may cause the processor 104 to further perform the following: receiving reconciliation data onto the centralized web-based collaborative platform hub to reconcile issues in developing the application based on received data related to failing of one or more test cases.

According to exemplary embodiments, the instructions, when executed, may cause the processor 104 to further perform the following: systematically feeding the innovation ideas data onto the centralized web-based collaborative platform hub; analyzing the innovation ideas data; prioritizing application development projects based on the analyzed innovation ideas data; and implementing governance aspects data standardized across the application development projects and functional areas.

Thus, the exemplary embodiments disclosed herein with reference to FIGS. 1-6 may provide platforms for implementing a centralized innovation framework module for collection of innovation ideas data from end users within an operation space and systemic feeding of those data onto a product development platform for allowing an agile development approach with prioritization and governance aspects standardized across projects and functional areas, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing a centralized innovation framework module by utilizing one or more processors and one or more memories, the method comprising:
    creating a centralized web-based collaborative platform hub for collection of innovation ideas data from end users within an operation space;
    causing the centralized web-based collaborative platform hub to receive innovation ideas data from an end user related to development of an application;
    analyzing, relative to meeting product development goals, the received innovation ideas data;
    establishing, based on the analyzing, a connection between the centralized web-based collaborative platform hub and a development platform;
    migrating the received innovation ideas data onto the development platform;
    creating a workflow on the development platform wherein the workflow tracks and manages development processes of the application;
    prioritizing application development projects based on the analyzed innovation ideas data;
    receiving predefined compliance data related to final approval of the application onto the centralized web-based collaborative platform hub;
    automatically generating test cases based on the received predefined compliance data;
    executing the test cases; and
    approving the application to go live when the centralized web-based collaborative platform hub receives data related to passing of the test cases.

2. The method according to claim 1, wherein the development platform is configured to provide agile project management tool that supports agile methodology in tracking and managing the development processes of the application.

3. The method according to claim 1, further comprising:
    establishing an automatic connectivity point between the centralized web-based collaborative platform hub and a tracking and governance system.

4. The method according to claim 3, further comprising:
    automatically transmitting data related to build status data via the automatic connectivity point; and
    receiving the build status data from the centralized web-based collaborative platform hub.

5. The method according to claim 4, further comprising:
    receiving reconciliation data onto the centralized web-based collaborative platform hub to reconcile issues in developing the application based on received data related to failing of one or more test cases.

6. The method according to claim 1, further comprising:
    systematically feeding the innovation ideas data onto the centralized web-based collaborative platform hub;
    analyzing the innovation ideas data; and
    implementing governance aspects data standardized across the application development projects and functional areas.

7. A system for implementing a centralized innovation framework module, the system comprising:
    a processor and one or more memories operatively connected to the processor via a communication network, wherein the processor is configured to:
    create a centralized web-based collaborative platform hub for collection of innovation ideas data from end users within an operation space;
    cause the centralized web-based collaborative platform hub to receive innovation ideas data from an end user related to development of an application;
    analyze, relative to meeting product development goals, the received innovation ideas data;
    establish, based on the analysis, a connection between the centralized web-based collaborative platform hub and a development platform;
    migrate the received innovation ideas data onto the development platform;
    create a workflow on the development platform wherein the workflow tracks and manages development processes of the application;
    prioritize application development projects based on the analyzed innovation ideas data;
    receive predefined compliance data related to final approval of the application onto the centralized web-based collaborative platform hub;
    automatically generate test cases based on the received predefined compliance data;
    execute the test cases; and
    approve the application to go live when the centralized web-based collaborative platform hub receives data related to passing of the test cases.

8. The system according to claim 7, wherein the development platform is configured to provide agile project management tool that supports agile methodology in tracking and managing the development processes of the application.

9. The system according to claim 7, wherein the processor is further configured to:
    establish an automatic connectivity point between the centralized web-based collaborative platform hub and a tracking and governance system.

10. The system according to claim 9, wherein the processor is further configured to:
   automatically transmit data related to build status data via the automatic connectivity point; and
   receive the build status data from the centralized web-based collaborative platform hub.

11. The system according to claim 10, wherein the processor is further configured to:
   receive reconciliation data onto the centralized web-based collaborative platform hub to reconcile issues in developing the application based on received data related to failing of one or more test cases.

12. The system according to claim 7, wherein the processor is further configured to:
   systematically feed the innovation ideas data onto the centralized web-based collaborative platform hub;
   analyze the innovation ideas data; and
   implement governance aspects data standardized across the application development projects and functional areas.

13. A non-transitory computer readable medium configured to store instructions for implementing a centralized innovation framework module, wherein, when executed, the instructions cause a processor to perform the following:
   creating a centralized web-based collaborative platform hub for collection of innovation ideas data from end users within an operation space;
   causing the centralized web-based collaborative platform hub to receive innovation ideas data from an end user related to development of an application;
   analyzing, relative to meeting product development goals, the received innovation ideas data;
   establishing, based on the analyzing, a connection between the centralized web-based collaborative platform hub and a development platform;
   migrating the received innovation ideas data onto the development platform;
   creating a workflow on the development platform wherein the workflow tracks and manages development processes of the application;
   prioritizing application development projects based on the analyzed innovation ideas data;
   receiving predefined compliance data related to final approval of the application onto the centralized web-based collaborative platform hub;
   automatically generating test cases based on the received predefined compliance data;
   executing the test cases; and
   approving the application to go live when the centralized web-based collaborative platform hub receives data related to passing of the test cases.

14. The non-transitory computer readable medium according to claim 13, wherein the instructions, when executed, causes the processor to further perform the following:
   establishing an automatic connectivity point between the centralized web-based collaborative platform hub and a tracking and governance system.

15. The non-transitory computer readable medium according to claim 14, wherein the instructions, when executed, causes the processor to further perform the following:
   automatically transmitting data related to build status data via the automatic connectivity point; and
   receiving the build status data from the centralized web-based collaborative platform hub.

16. The non-transitory computer readable medium according to claim 15, wherein the instructions, when executed, causes the processor to further perform the following:
   receiving reconciliation data onto the centralized web-based collaborative platform hub to reconcile issues in developing the application based on received data related to failing of one or more test cases.

17. The non-transitory computer readable medium according to claim 13, wherein the instructions, when executed, causes the processor to further perform the following:
   systematically feeding the innovation ideas data onto the centralized web-based collaborative platform hub;
   analyzing the innovation ideas data; and
   implementing governance aspects data standardized across the application development projects and functional areas.

* * * * *